US012403817B2

(12) United States Patent
Hachisuka

(10) Patent No.: US 12,403,817 B2
(45) Date of Patent: Sep. 2, 2025

(54) CONTROL APPARATUS, CONTROL METHOD, AND PROGRAM FOR CONTROLLING VEHICLE HEADLAMPS

(71) Applicants: TOYOTA JIDOSHA KABUSHIKI KAISHA, Toyota (JP); DENSO CORPORATION, Kariya (JP)

(72) Inventor: Motoaki Hachisuka, Nagoya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 105 days.

(21) Appl. No.: 18/465,456

(22) Filed: Sep. 12, 2023

(65) Prior Publication Data

US 2024/0109475 A1 Apr. 4, 2024

(30) Foreign Application Priority Data

Sep. 29, 2022 (JP) .................................. 2022-155977

(51) Int. Cl.
*B60Q 1/14* (2006.01)
*G06V 20/58* (2022.01)

(52) U.S. Cl.
CPC ............ *B60Q 1/143* (2013.01); *G06V 20/58* (2022.01); *B60Q 2300/12* (2013.01); *B60Q 2300/32* (2013.01); *B60Q 2300/41* (2013.01)

(58) Field of Classification Search
None
See application file for complete search history.

(56) References Cited

U.S. PATENT DOCUMENTS

| | | | |
|---|---|---|---|
| 6,587,573 B1* | 7/2003 | Stam | B60Q 1/143 382/104 |
| 10,634,303 B2 | 4/2020 | Tanaka et al. | |
| 10,640,035 B2* | 5/2020 | Morimura | B60Q 1/525 |
| 10,759,329 B2* | 9/2020 | Morimura | B60Q 1/346 |
| 10,946,791 B2* | 3/2021 | Morimura | B60Q 1/381 |
| 11,260,789 B2 | 3/2022 | Morimura et al. | |

(Continued)

FOREIGN PATENT DOCUMENTS

| CN | 106274646 A | 1/2017 |
|---|---|---|
| EP | 2 636 946 A2 | 9/2013 |

(Continued)

*Primary Examiner* — Fekadeselassie Girma
(74) *Attorney, Agent, or Firm* — Sughrue Mion, PLLC

(57) ABSTRACT

In a vehicle headlamp control apparatus, a light distribution control section controls light distribution of a headlamp based on a detected light control target object ahead of a vehicle and a detected behavior of the vehicle or an expected change thereof. When the behavior is in a first behavior state in which a change in the headlamp irradiation area becomes equal to or less than a predetermined amount or the behavior is expected not to change from the first behavior state, the light distribution control section causes the headlamp to project light in a standard pattern. When the behavior is in a second behavior state in which the change in the headlamp irradiation area exceeds the predetermined amount or the behavior is expected to change to the second behavior state, the light distribution control section causes the headlamp to project light in a pattern different from the standard pattern.

7 Claims, 12 Drawing Sheets

(56) References Cited

U.S. PATENT DOCUMENTS

| | | | | |
|---|---|---|---|---|
| 2011/0234422 | A1* | 9/2011 | Yamashita | B60Q 5/006 |
| | | | | 340/901 |
| 2013/0177202 | A1* | 7/2013 | Dierks | B60Q 1/08 |
| | | | | 362/466 |
| 2014/0062685 | A1* | 3/2014 | Tamatsu | G08G 1/005 |
| | | | | 340/425.5 |
| 2015/0258928 | A1* | 9/2015 | Goto | B60Q 1/525 |
| | | | | 701/49 |
| 2017/0225608 | A1* | 8/2017 | Stahlin | B60Q 1/085 |
| 2018/0093604 | A1* | 4/2018 | George | H04W 4/40 |
| 2018/0173237 | A1* | 6/2018 | Reiley | G05D 1/0061 |
| 2018/0178711 | A1* | 6/2018 | Wang | B60Q 1/1423 |
| 2018/0276986 | A1* | 9/2018 | Delp | B60K 35/65 |
| 2018/0347778 | A1* | 12/2018 | Sung | F21S 41/60 |
| 2019/0168664 | A1* | 6/2019 | Tatara | B60Q 1/445 |
| 2020/0150702 | A1* | 5/2020 | Ueda | G05D 1/43 |
| 2024/0116428 | A1 | 4/2024 | Ishihara et al. | |
| 2024/0362931 | A1* | 10/2024 | Katz | G06V 40/20 |

FOREIGN PATENT DOCUMENTS

| | | |
|---|---|---|
| EP | 3 187 369 A1 | 7/2017 |
| EP | 3 246 204 A1 | 11/2017 |
| EP | 3 459 790 A1 | 3/2019 |
| EP | 4 563 412 A1 | 6/2025 |
| JP | 2013-43617 A | 3/2013 |
| JP | 2014-101069 A | 6/2014 |
| JP | 2015-214281 A | 12/2015 |
| WO | 2020/064008 A1 | 4/2020 |
| WO | 2022/172860 A1 | 8/2022 |

* cited by examiner

CONTROL APPARATUS, CONTROL METHOD, AND PROGRAM FOR CONTROLLING VEHICLE HEADLAMPS

CROSS-REFERENCE TO RELATED APPLICATION

This application claims priority to Japanese Patent Application No. JP2022-155977 filed on Sep. 29, 2022, the content of which is hereby incorporated by reference in its entirety into this application.

BACKGROUND OF THE INVENTION

Technical Field

The present disclosure relates to a control apparatus for controlling vehicle headlamps, to a control method for controlling vehicle headlamps, and to a program for controlling vehicle headlamps.

Description of the Related Art

In the field of vehicle headlamps, ADB (adaptive driving beam) headlamps which control the light distribution of a high beam in accordance with the position of a preceding vehicle or the like have been put to practical use. For example, Japanese Patent Application Laid-Open (kokai) No. 2014-101069 discloses a technique for performing dimming control, when an own vehicle enters a relatively sharp curve (curved road), so as to reduce the luminous intensity on the inner side of the curve, thereby preventing glare (which causes dazzle) from reaching a preceding vehicle, while traveling along the curve.

In the case where, when the own vehicle travels along a curve, the quantity of light on the inner side of the curve is reduced over a wide area, a driver encounters the problem that the visibility on the inner side of the curve lowers. Also, in the case of a road having a series of repeated curves, the dimming control cannot follow, and the preceding vehicle may experience glare. The technique described in Japanese Patent Application Laid-Open No. 2014-101069 determines that the own vehicle has entered the curve on the basis of the steering angle of the own vehicle, and starts the dimming control when the own vehicle has entered the curve. Therefore, there is a problem that the dimming control is not performed at a point in time when the preceding vehicle has entered the curve before the own vehicle, and consequently, the preceding vehicle experiences glare. Namely, there is a room for improvement in optimization of light distribution control.

SUMMARY OF THE INVENTION

The present disclosure discloses a technique which has been achieved so as to solve the above-described problem. Namely, an object of the technique is to optimize light distribution control of vehicle headlamps.

A control apparatus of the present disclosures is a control apparatus (10) for controlling a vehicle headlamp (70) which projects irradiation light toward a forward direction of an own vehicle (SV).

The control apparatus (10) comprises:
a target object detection section (100) which detects a light control target object which is present in the forward direction of the own vehicle (SV) and within an irradiation area (A) of the headlamp (70);
a behavior detection section (110, 120) which detects a behavior of the own vehicle (SV) or determines whether or not a change in behavior of the own vehicle (SV) is expected; and
a light distribution control section (130, 140) which controls a light distribution of the headlamp (70) on the basis of a result of detection by the target object detection section (100) and a result of detection or determination by the behavior detection section (110, 120).

In the case where the behavior of the own vehicle (SV) detected by the behavior detection section (110, 120) is in a first behavior state in which a change in the irradiation area (A) of the headlamp (70) becomes equal to or less than a predetermined amount or it is expected that the behavior of the own vehicle does not change from the first behavior state, the light distribution control section (130, 140) causes the headlamp (70) to project irradiation light toward the light control target object in a predetermined standard irradiation pattern.

In the case where the behavior of the own vehicle (SV) detected by the behavior detection section (110, 120) is in a second behavior state in which the change in the irradiation area (A) of the headlamp (70) exceeds the predetermined amount or it is expected that the behavior of the own vehicle (SV) changes to the second behavior state, the light distribution control section (130, 140) causes the headlamp (70) to project irradiation light toward the light control target object in an irradiation pattern different from the standard irradiation pattern.

A control method of the present disclosure is a control method for controlling a vehicle headlamp (70) which projects irradiation light toward a forward direction of an own vehicle (SV).

The control method executes:
a target object detection process which detects a light control target object which is present in the forward direction of the own vehicle (SV) and within an irradiation area (A) of the headlamp (70);
a behavior detection process which detects a behavior of the own vehicle (SV) or determines whether or not a change in behavior of the own vehicle (SV) is expected; and
a light distribution control process which controls a light distribution of the headlamp (70) on the basis of a result of detection by the target object detection process and a result of detection or determination by the behavior detection process.

In the case where the behavior of the own vehicle (SV) detected by the behavior detection process is in a first behavior state in which a change in the irradiation area (A) of the headlamp (70) becomes equal to or less than a predetermined amount or it is expected that the behavior of the own vehicle (SV) does not change from the first behavior state, in the light distribution control process, the headlamp (70) is caused to project irradiation light toward the light control target object in a predetermined standard irradiation pattern.

In the case where the behavior of the own vehicle (SV) detected by the behavior detection process is in a second behavior state in which the change in the irradiation area (A) of the headlamp (70) exceeds the predetermined amount or it is expected that the behavior of the own vehicle (SV) changes to the second behavior state, in the light distribution control process, the headlamp (70) is caused to project irradiation light toward the light control target object in an irradiation pattern different from the standard irradiation pattern.

A program of the present disclosure is used for a computer of a vehicle headlamp (70) which projects irradiation light toward a forward direction of an own vehicle (SV).

The program causes the computer to execute:
- a target object detection process which detects a light control target object which is present in the forward direction of the own vehicle (SV) and within an irradiation area (A) of the headlamp (70);
- a behavior detection process which detects a behavior of the own vehicle (SV) or determines whether or not a change in behavior of the own vehicle (SV) is expected; and
- a light distribution control process which controls a light distribution of the headlamp (70) on the basis of a result of detection by the target object detection process and a result of detection or determination by the behavior detection process.

In the case where the behavior of the own vehicle (SV) detected by the behavior detection process is in a first behavior state in which a change in the irradiation area (A) of the headlamp (70) becomes equal to or less than a predetermined amount or it is expected that the behavior of the own vehicle (SV) does not change from the first behavior state, in the light distribution control process, the headlamp (70) is caused to project irradiation light toward the light control target object in a predetermined standard irradiation pattern.

In the case where the behavior of the own vehicle (SV) detected by the behavior detection process is in a second behavior state in which the change in the irradiation area (A) of the headlamp (70) exceeds the predetermined amount or it is expected that the behavior of the own vehicle (SV) changes to the second behavior state, in the light distribution control process, the headlamp (70) is caused to project irradiation light toward the light control target object in an irradiation pattern different from the standard irradiation pattern.

In the above-described configuration, the light distribution control section (130, 140) appropriately changes the irradiation pattern of the irradiation light projected from the headlamp (70) toward the light control target object on the basis of a change in the behavior of the own vehicle (SV) or whether or not a change in behavior is expected. Thus, it becomes possible to optimize the light distribution control of the headlamp (70).

In the control apparatus of the present disclosure, the light distribution control section (130, 140) may be configured to set a light control target area (LA) within the irradiation area (A) at a position corresponding to the light control target object, the light control target area (LA) being an area toward which irradiation light having a luminous intensity different from that in the remaining area (HA) within the irradiation area (A) is projected.

In the case where the second behavior state is a behavior state in which the irradiation area (A) of the headlamp (70) moves vertically by an amount greater than the predetermined amount, the light distribution control section (130, 140) expands the light control target area (LA) upward and downward in relation to the standard irradiation pattern or adds gradual change areas to upper and lower edges of the light control target area (LA), the gradual change areas being areas in which luminous intensity is changed gradually. In the case where the second behavior state is a behavior state in which the irradiation area (A) of the headlamp (70) moves laterally by an amount greater than the predetermined amount, the light distribution control section (130, 140) expands the light control target area (LA) leftward and rightward in relation to the standard irradiation pattern or adds gradual change areas to left and right edges of the light control target area (LA), the gradual change areas being areas in which luminous intensity is changed gradually.

By virtue of the above-described configuration, it becomes possible to set an optimum light control target area (LA) in accordance with changes in the behavior of the own vehicle (SV) in the vertical and lateral directions.

In the control apparatus of the present disclosure, the light distribution control section (130, 140) may dim the irradiation light projected toward the light control target area (LA), as compared with the irradiation light projected toward the remaining area (HA).

By virtue of the above-described configuration, it becomes possible to effectively prevent a preceding vehicle (V1), an oncoming vehicle (V2), a pedestrian (HM), etc. in the forward direction of the own vehicle (SV), from experiencing glare, by dimming the light control target area (LA).

In the control apparatus of the present disclosure, the light distribution control section (130, 140) may be configured such that, in the case where the target object detection section (100) detects, as the light control target object, a preceding vehicle (V1) traveling in the forward direction of the own vehicle (SV) and the behavior detection section (120) determines that the behavior of the own vehicle (SV) is expected to change as a result of traveling on a curved road present in the forward direction of the own vehicle (SV), the light distribution control section (130, 140) expands the light control target area (LA) toward an inner side of the curved road toward which the preceding vehicle (V1), which enters the curved road before the own vehicle (SV), travels, or adds the gradual change area to an edge of the light control target area (LA) on the inner side of the curved road.

By virtue of the above-described configuration, the light distribution control section (130, 140) expands the light control target area (LA) or adds the gradual change areas to the light control target area (LA) at the time when a change in behavior of the own vehicle (SV) is expected. As a result, it becomes possible to effectively prevent the preceding vehicle (V1) which enters the curved road before the own vehicle (SV) from experiencing glare.

In the control apparatus of the present disclosure, the behavior detection section (110, 120) may detect the behavior of the own vehicle (SV) or determine whether or not a change in behavior of the own vehicle (SV) is expected, on the basis of at least one of a result of detection by a sensor (20) which detects a state of the own vehicle (SV), a road shape in the forward direction of the own vehicle (SV) obtained from a piece of map information (45) and a GPS apparatus (40), a piece of information received through V2X communication (50), and a piece of weather information.

By virtue of the above-described configuration, the behavior detection section (110, 120) can effectively obtain a change in behavior of the own vehicle (SV) or a situation where a change in behavior of the own vehicle (SV) is expected.

In the above description, in order to facilitate understanding of the present invention, the constituent elements of the invention corresponding to those of an embodiment are accompanied by parenthesized reference numerals which are used in the embodiment; however, the constituent elements of the invention are not limited to those in the embodiment defined by the reference numerals.

DESCRIPTION OF THE PREFERRED EMBODIMENT

A control apparatus, a control method, and a program for controlling vehicle headlamps according to an embodiment will now be described with reference to the drawings.

Figure 1:
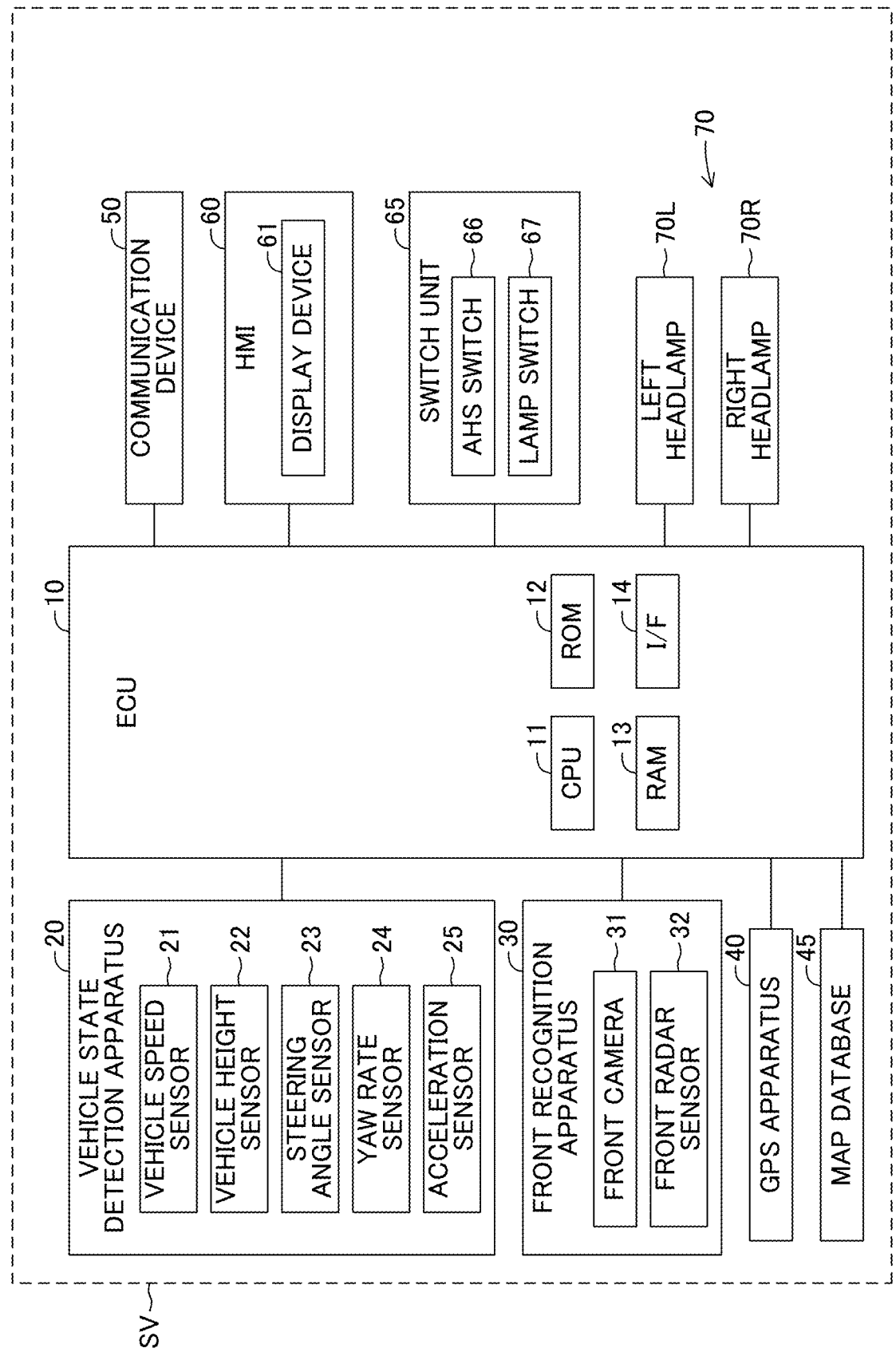
FIG. 1 is a schematic diagram showing the hardware configuration of a vehicle according to an embodiment.

Hardware Configuration:

FIG. 1 is a diagram showing the hardware configuration of a vehicle SV according to the present embodiment. In the following description, the vehicle SV may be referred to as the own vehicle when the vehicle SV must be distinguished from other vehicles, etc.

The vehicle SV includes an ECU 10 as a control apparatus. The term "ECU" is an abbreviation for electronic control unit. The ECU 10 includes a CPU (central processing unit) 11, a ROM (read only memory) 12, a RAM (random access memory) 13, an interface unit 14, etc. The CPU 11 executes various programs stored in the ROM 12. The ROM 12 is a non-volatile memory and stores data, etc. which are necessary for the CPU 11 to execute the various programs. The RAM 13 is a volatile memory and provides a working space in which the various programs are developed when executed by the CPU 11. The interface unit 14 is a communication device for communications with external apparatuses.

The ECU 10 is a central unit which performs various types of controls for the vehicle SV, such as light distribution control for headlamps 70L and 70R. Therefore, a vehicle state detection apparatus 20, a front recognition apparatus 30, a GPS (global positioning system) apparatus 40, a map database 45, a communication device 50, an HMI (human machine interface) 60, a switch unit 65, a left headlamp 70L, a right headlamp 70R, etc. are communicably connected to the ECU 10.

The vehicle state detection apparatus 20 is a group of sensors for detecting the state of the vehicle SV. Specifically, the vehicle state detection apparatus 20 includes a vehicle speed sensor 21, a vehicle height sensor 22, a steering angle sensor 23, a yaw rate sensor 24, an acceleration sensor 25, etc.

The vehicle speed sensor 21 detects the travel speed of the vehicle SV (vehicle speed V). The vehicle speed sensor 21 may be a wheel speed sensor. The vehicle height sensor 22 detects a vehicle height H, for example, on the basis of the amount of relative displacement between the axel and body of the vehicle SV. The steering angle sensor 23 detects the rotation angle of an unillustrated steering wheel or steering shaft of the vehicle SV; i.e., steering angle θS. The yaw rate sensor 24 detects the yaw rate of the vehicle SV. The acceleration sensor 25 detects the acceleration of the vehicle SV. The vehicle state detection apparatus 20 transmits the state of the vehicle SV detected by the sensors 21 to 25 to the ECU 10 at predetermined intervals.

The front recognition apparatus 30 is a group of sensors for recognizing pieces of object information regarding objects present in the forward direction of the vehicle SV. Specifically, the front recognition apparatus 30 includes a front camera 31, a front radar sensor 32, etc. Herein, "the forward direction of the vehicle SV" is a conceptual expression which encompasses not only the front direction but also an obliquely left forward direction and an obliquely right forward direction. Examples of the pieces of object information include preceding vehicles, oncoming vehicles, bicycles, pedestrians, traffic signs, white lines, etc.

The front camera 31 is, for example, a stereo camera or a monocular camera, and a digital camera including an image sensor such as a CMOS or a CCD can be used. The front camera 31 is disposed, for example, on an upper portion of a front windshield glass of the vehicle SV. The front camera 31 obtains image data by capturing an image of a scene in the forward direction of the vehicle SV and processes the obtained image data, thereby obtaining a piece of information regarding an object located ahead of the vehicle SV (hereinafter referred to as the "object information") The object information is a piece of information which represents the type of the object detected ahead of the vehicle SV, the relative distance between the vehicle SV and the object, the relative speed between the vehicle SV and the object, etc. The type of the object may be recognized, for example, by machine learning such as pattern matching or the like.

The front radar sensor 32 is provided, for example, at a front portion of the vehicle SV and detects an object present in a region in the forward direction of the vehicle SV. The front radar sensor 32 includes a millimeter wave radar and/or an LiDAR. The millimeter wave radar radiates a radio wave in the millimeter wave band (millimeter wave) and receives a millimeter wave (reflection wave) reflected by an object present in the region to which the millimeter wave is radiated. The millimeter wave radar obtains the relative distance between the vehicle SV and the object, the relative speed between the vehicle SV and the object, etc. on the basis of the phase difference between the transmitted millimeter wave and the received reflection wave, the level of attenuation of the reflection wave, the time elapsed until the reflection wave is received after the millimeter wave has been transmitted, etc. The LiDAR emits pulses of laser light having a wavelength shorter than that of the millimeter wave in different directions sequentially through scanning operation, and receives reflection light from an object, thereby obtaining the shape of the object detected in the forward direction of the vehicle SV, the relative distance between the vehicle SV and the object, the relative speed between the vehicle SV and the object, etc.

The front recognition apparatus 30 transmits the obtained object information to the ECU 10 at predetermined intervals. The ECU 10 determines the relative relation between the vehicle SV and the object by combining the relative relation between the vehicle SV and the object obtained by the front camera 31 and the relative relation between the vehicle SV and the object obtained by the front radar sensor 32. Notably, the front recognition apparatus 30 is not necessarily required to include both the front camera 31 and the front radar sensor 32, and may include, for example, the front camera 31 only.

The GPS apparatus 40 obtains a piece of position information, which represents the present position and bearing of the vehicle SV, on the basis of GPS signals received from a plurality of artificial satellites. The GPS apparatus 40 transmits the obtained position information of the vehicle SV to the ECU 10 at predetermined intervals. Notably, the position information of the vehicle SV may be obtained by V2X (vehicle-to-everything) communication performed by using the communication device 50, which will be described later.

The map database 45 is a database of map information and is stored in a storage device (hard disk, flash memory, etc.) provided in the vehicle SV. The map information includes pieces of information which represent the positions of roads, intersections, etc., and road shapes (curve, straight, width, inclination, etc.). Notably, the map database 45 may be stored in an external server which can communicate with the vehicle SV. In this case, the vehicle SV may obtain the map information from the external server by using the communication device 50.

The communication device 50 performs V2X communication. Specifically, the communication device 50 performs V2V (vehicle-to-vehicle) communication between the own vehicle SV and other vehicles, and performs V2I (road-to-vehicle) communication between the own vehicle SV and the infrastructure. The communication device 50 can obtain pieces of information regarding the environment around the own vehicle SV (hereinafter referred to as the environmental information) through the V2X communication. Examples of environmental information include weather information, traffic congestion information, and road surface information. The communication device 50 transmits the obtained pieces of environmental information to the ECU 10 at predetermined intervals.

The HMI 60 is an interface for exchanging pieces of information between the ECU 10 and a driver. Specifically, the HMI 60 includes an input device and an output device. Examples of the input device include a touch panel and a switch. Examples of the output device include a display device 61 and a speaker. Examples of the display device 61 include a center display disposed on an instrument panel or the like and a head-up display.

The switch unit 65 includes an AHS (adaptive high-beam system) switch 66, a lamp switch 67, etc. The AHS switch 66 is an ON-OFF switch for activating the AHS. The lamp switch 67 is a switch for selecting low beam, high beam, automatic lighting, etc. The AHS starts, for example, when the AHS switch 66 is turned on or when the lamp switch 67 is operated to select the automatic lighting.

The left headlamp 70L and the right headlamp 70R project irradiation light in the forward direction of the vehicle SV. Herein, "the forward direction of the vehicle SV" is a conceptual expression which encompasses not only the front direction but also an obliquely left forward direction and an obliquely right forward direction. The left headlamp 70L is provided on the left side of a front portion of the vehicle SV. The right headlamp 70R is provided on the right side of the front portion of the vehicle SV. Notably, the left headlamp 70L and the right headlamp 70R basically have the same structure; specifically, have respective structures which are mirror-images of each other. Therefore, in the following description, in the case where the left headlamp 70L and the right headlamp 70R are not required to be distinguished from each other, the left headlamp 70L and the right headlamp 70R may be referred to simply as the "headlamp 70." Also, as to the low beam (headlamp for passing each other) provided in the headlamp 70, description is omitted.

Figure 2:
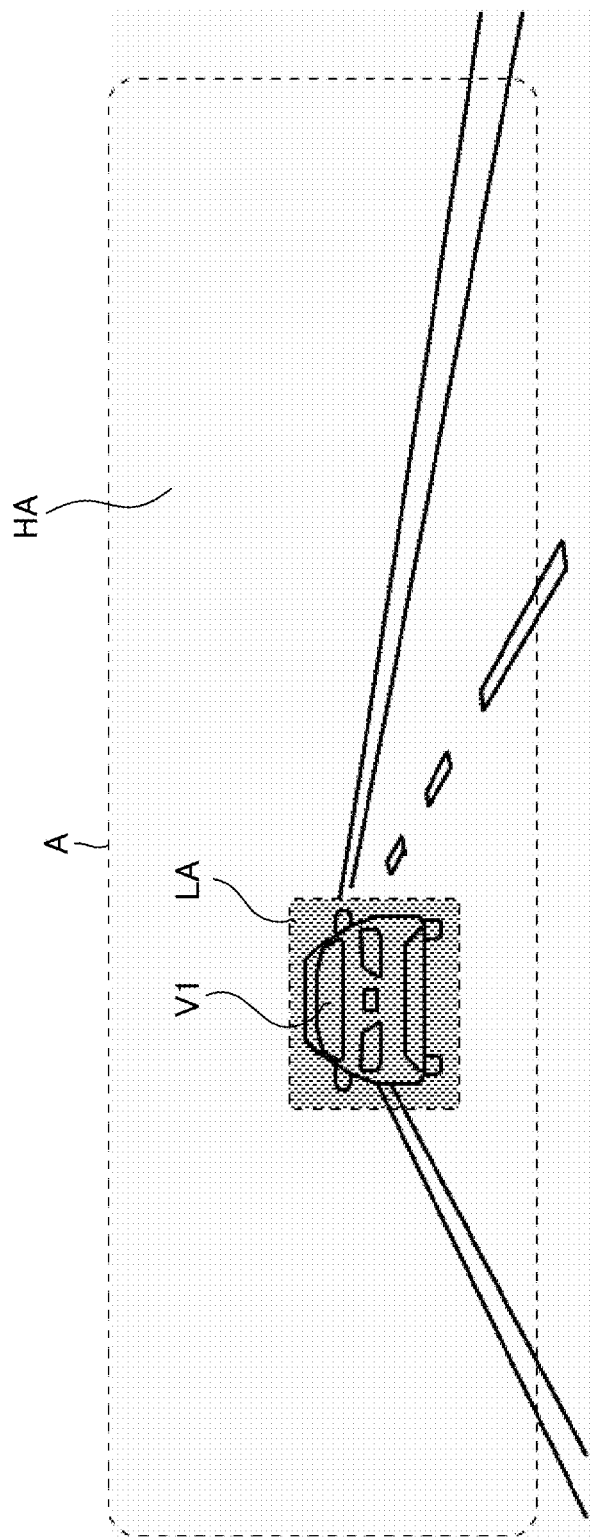
FIG. 2 is a schematic diagram used for describing one example of the distribution of light projected on an imaginary vertical screen.

On the basis of an irradiation light control signal transmitted from the ECU 10, the headlamp 70 generates high beam irradiation light whose distribution is determined in accordance with the positions of light control target objects (a preceding vehicle, an oncoming vehicle, a pedestrian, a sign, etc.). FIG. 2 is a schematic diagram showing one example of the distribution of irradiation light from the headlamp 70 projected on an imaginary vertical screen located at a predetermined position in the forward direction of the vehicle SV.

Notably, the light distribution shown in FIG. 2 is the composed distribution of irradiation light from the left headlamp 70L and irradiation light of the right headlamp 70R. An area surrounded by a broken line A in FIG. 2 shows an entire irradiation area on the imaginary vertical screen in which light is projected by high beam irradiation of the headlamp 70. The high beam irradiation light is controlled to reach a farther area as the vehicle speed V of the own vehicle SV increases. Therefore, the entire irradiation area A on the imaginary vertical screen is decreased in size as the vehicle speed V increases.

In the case where the ECU 10 detects, for example, a preceding vehicle V1 as a light control target object, on the basis of the result of detection by the front recognition apparatus 30, the headlamp 70 provides high beam irradiation which has a light distribution pattern determined such that the irradiation light in an area LA located within the entire irradiation area A and corresponding to the position of the preceding vehicle V1 is dimmed as compared with the remaining area. Notably, in the present disclosure, "dimming of irradiation light" is a conceptual expression which encompasses blocking of irradiation light. In the following description, the area LA will be referred to as a "low luminous intensity area." Also, an area which is located within the entire irradiation area A and is other than the low luminous intensity area LA will be referred to as a "high luminous intensity area HA." The low luminous intensity area LA is one example of the light control target area of the present disclosure.

No particular limitation is imposed on the specific structure of the headlamp 70 and the headlamp 70 may have any structure so long as the headlamp 70 has a resolution which enables setting, as a light distribution pattern, of the high luminous intensity area HA and the low luminous intensity area LA (containing a light control target object) within the entire irradiation area A. Examples of headlamps having such a resolution include a headlamp including a plurality of LEDs (light emitting diodes) disposed in a matrix, a headlamp including a DMD (digital mirror device) composed of a plurality of micro mirror elements disposed in a matrix, and a headlamp including an MEMS (micro electro mechanical systems) mirror. Notably, since the structures of these headlamps are well known, the structures of these headlamps will be described briefly.

Figure 3A:
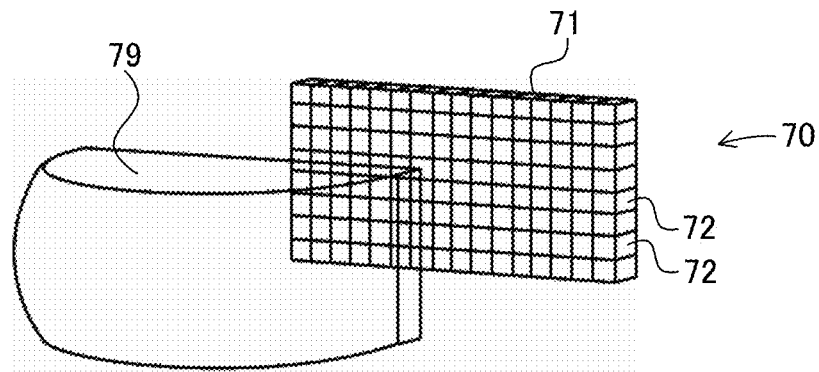
FIGS. 3(A) to 3(C) are schematic diagrams used for describing examples of the structure of a headlamp according to the embodiment.

In the case where the headlamp 70 includes a matrix LED 71 as shown in FIG. 3A, the light distribution pattern is produced by projecting, through a projection lens 79, an image drawn by a plurality of LEDs 72 disposed in a matrix. The brightness (irradiation luminous intensity) of each LED 72 can be adjusted by controlling the ratio of an ON period to one ON-OFF period (duty ratio). A desired low luminous intensity area LA (see FIG. 2) can be generated in the entire irradiation area A by making the brightness of the LEDs 72 taking part in formation of the low luminous intensity area LA lower than those of other LEDs 72.

Figure 3B:
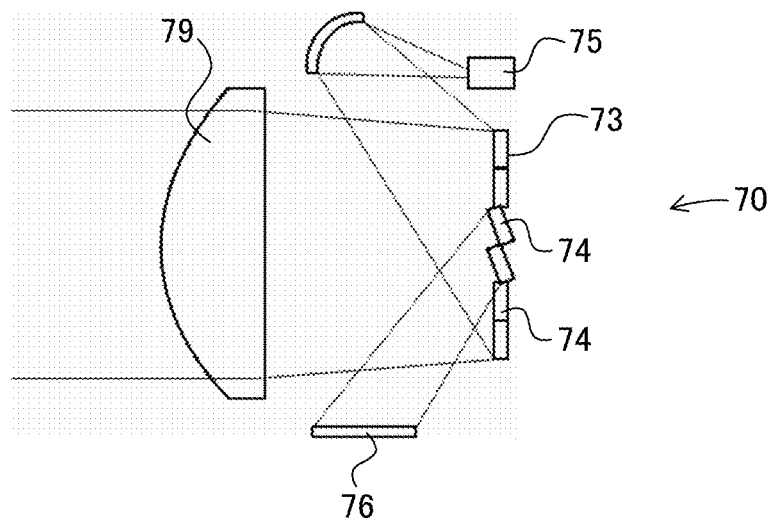

In the case where the headlamp 70 includes a DMD 73 as shown in FIG. 3B, the light distribution pattern is produced by projecting, through the projection lens 79, an image drawn by reflection light from a plurality of micro mirror elements 74 disposed in a matrix. Each micro mirror element 74 can adjust the reflection direction of light emitted from a light source 75 by controlling the angle of its reflection surface. A desired low luminous intensity area LA (see FIG. 2) can be generated in the entire irradiation area A by directing the reflection light of the micro mirror elements 74 corresponding to the low luminous intensity area LA toward a light absorber 76 which does not contribute to the light distribution, and directing the reflection light of the micro mirror elements 74 corresponding to the high luminous intensity area HA toward the projection lens 79.

Figure 3C:
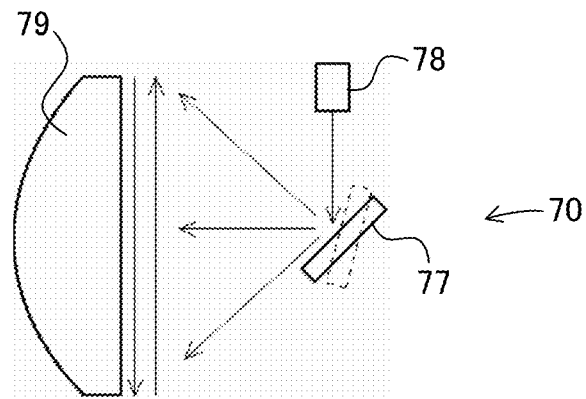

In the case where the headlamp 70 includes an MEMS mirror 77 as shown in FIG. 3C, the light distribution pattern is produced by projecting, through the projection lens 79, an image drawn by laser light from the MEMS mirror 77 as a result of its scanning operation. A desired low luminous intensity area LA can be generated in the entire irradiation area A by lowering the brightness (luminous intensity) of the laser light source 78 when the low luminous intensity area LA is scanned with laser light, as compared when the high luminous intensity area HA is scanned with laser light.

Notably, the structure of the headlamp 70 is not limited to the structures shown in FIGS. 3A to 3C, and it is possible to use other structures which provide a desired high resolution; such as a structure in which an image drawn by reflection light from a rotary reflector having a plurality of blades is projected through a projection lens and a structure in which an image drawn by an LCD (liquid crystal display) is projected through a projection lens.

Figure 4:
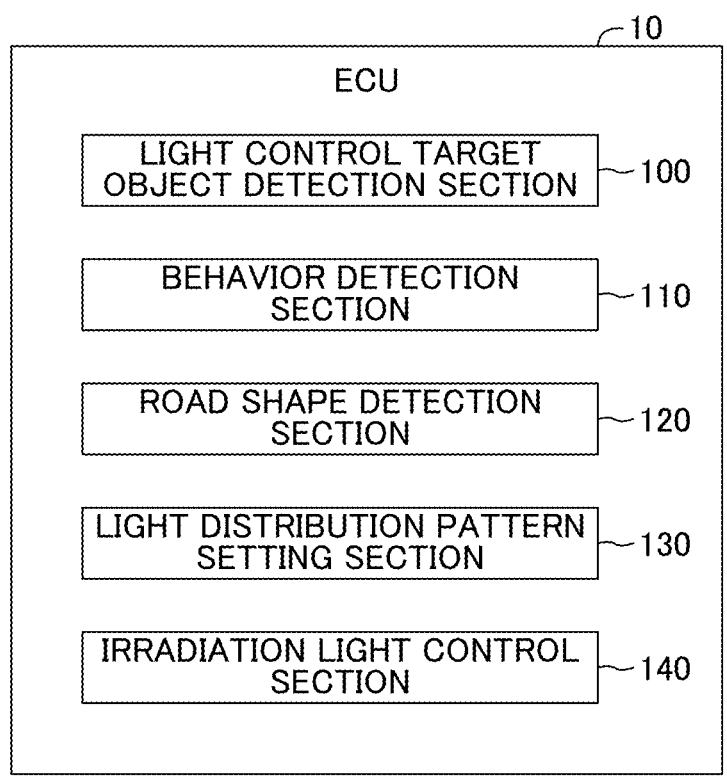
FIG. 4 is a schematic diagram showing the software configuration of a control apparatus according to the embodiment.

Software Configuration:

FIG. 4 is a schematic diagram showing the software configuration of the control apparatus according to the present embodiment.

As shown in FIG. 4, the ECU 10 includes a light control target object detection section 100, a behavior detection section 110, a road shape detection section 120, a light distribution pattern setting section 130, an irradiation light control section 140, etc. as functional elements. The CPU 11 of the ECU 10 realizes each of these functional elements 100 to 140 by reading a program stored in the ROM 12, loading the read program into the RAM 13, and executing the loaded program. Notably, the functional elements 100 to 140 will be described under the assumption that, in the present embodiment, the functional elements 100 to 140 are contained in the ECU 10, which is a single hardware unit. However, some of the functional elements 100 to 140 may be provided in another ECU different from the ECU 10. Alternatively, all or some of the functional elements 100 to 140 of the ECU 10 may be provided in an information processing apparatus of a facility (for example, a management center or the like) which can communicate with the vehicle SV.

Figure 5:
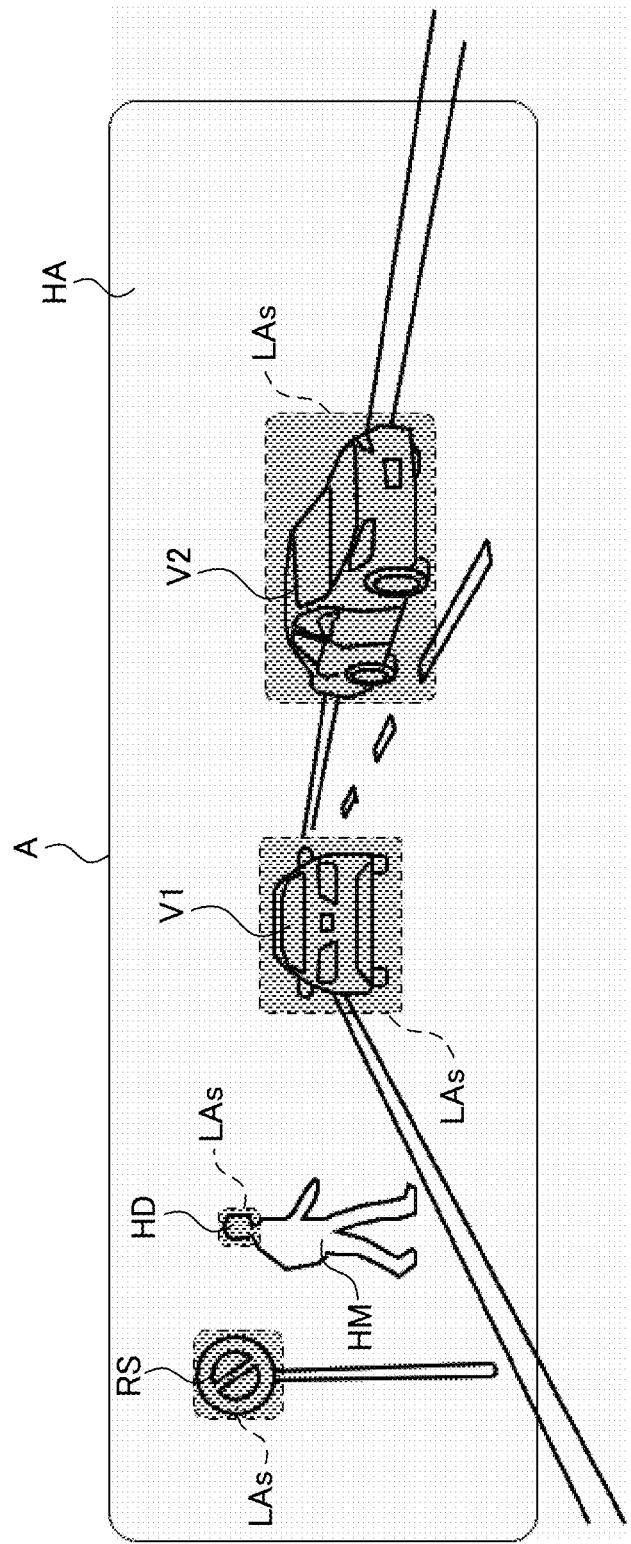
FIG. 5 is a schematic diagram used for describing one example of a light distribution pattern set by a light distribution pattern setting section.

The light control target object detection section 100 detects a light control target object present in the forward direction of the own vehicle SV on the basis of the object information transmitted from the front recognition apparatus 30. Specifically, as shown in FIG. 5, the light control target object detection section 100 detects, as light control target objects, a preceding vehicle V1 traveling in the forward direction of the own vehicle SV, an oncoming vehicle V2 approaching the own vehicle SV from the forward direction, at least a head portion HD of a pedestrian HM in the forward direction of the own vehicle SV, and a retroreflective object RS, such as a road sign, present in the forward direction of the own vehicle SV. Upon detection of the light control target objects, the light control target object detection section 100 transmits pieces of light control target object information, including, for example, the relative positions of the detected light control target objects in relation to the own vehicle SV, to the light distribution pattern setting section 130 at predetermined intervals.

The behavior detection section 110, which is one example of the behavior detection section of the present disclosure, detects a behavior of the own vehicle SV on the basis of the state of the own vehicle SV transmitted from the vehicle state detection apparatus 20. In the case where the own vehicle SV travels on, for example, a bumpy road, since the behavior of the own vehicle SV changes in the vertical direction, the entire irradiation area A of irradiation light projected from the headlamp 70 onto the imaginary vertical screen also moves in the vertical direction. Also, for example, in the case where the own vehicle SV travels on a road where its behavior changes frequently or the case where a driver's steering operation is instable, since the behavior the own vehicle SV moves in the lateral direction, the entire irradiation area A of irradiation light projected from the headlamp 70 onto the imaginary vertical screen also moves in the lateral direction.

The behavior detection section 110 determines, on the basis of the pitching frequency PF of the own vehicle SV, whether or not the behavior of the own vehicle SV is in a state in which the behavior causes displacement in the vertical direction of the entire irradiation area A of irradiation light, projected from the headlamp 70 onto the imaginary vertical screen, by an amount greater than a predetermined amount (hereinafter, this state will be referred to as a "vertical displacement state"). The pitching frequency PF can be obtained, for example, by counting the number of times the vehicle height H detected by the vehicle height sensor 22 changes a predetermined amount or more per unit time having a predetermined length. The behavior detection section 110 determines that the behavior of the own vehicle SV is in the vertical displacement state when the pitching frequency PF has exceeded a predetermined threshold value PFv (PF>PFv). The threshold value PFv may be a fixed value or a variable value which varies in accordance with the vehicle speed V, etc.

The behavior detection section 110 determines, on the basis of the steering input frequency SF of the own vehicle SV, whether or not the behavior of the own vehicle SV is in a state in which the behavior causes displacement in the lateral direction of the entire irradiation area A of irradiation light, projected from the headlamp 70 onto the imaginary vertical screen, by an amount greater than a predetermined amount (hereinafter, this state will be referred to as a "lateral displacement state"). The steering input frequency SF can be obtained by, for example, by counting the number of times the steering angle θS detected by the steering angle sensor 23 changes a predetermined amount or more per unit time having a predetermined length. The behavior detection section 110 determines that the behavior of the own vehicle SV is in the lateral displacement state when the steering input frequency SF has exceeded a predetermined threshold value SFv (SF>SFv). The threshold value SFv may be a fixed value or a variable value which varies in accordance with the vehicle speed V, etc.

The behavior detection section 110 transmits the detected behavior (the vertical displacement state, the lateral displacement state) of the own vehicle SV to the light distribution pattern setting section 130 at predetermined intervals. Notably, the behavior detection section 110 may detect the behavior of the own vehicle SV on the basis of the result of detection by the yaw rate sensor 24 and the result of detection by the acceleration sensor 25. Also, the behavior detection section 110 may detect the behavior of the own vehicle SV on the basis of the image of a scene in the forward direction of the own vehicle SV captured by the front camera 31.

The road shape detection section 120, which is one example of the behavior detection section of the present disclosure, obtains a road shape in the forward direction of the own vehicle SV on the basis of the position information obtained from the GPS apparatus 40 and representing the position of the own vehicle SV and the map information of the map database 45. Specifically, the road shape detection section 120 obtains a road shape at a position which is located a predetermined distance ahead of the present position of the own vehicle SV. If the road shape at a position located the predetermined distance ahead of the own vehicle SV is obtained, it is possible to determine whether or not the own vehicle SV is in a situation where a change in behavior of the own vehicle SV is expected. No particular limitation is imposed on the predetermined distance, and the predetermined distance may be set such that the predetermined distance is shorter than the irradiation distance of the high beam of the headlamp 70 and is longer than an ordinary vehicle-to-vehicle distance between the own vehicle SV and a preceding vehicle. The predetermined distance may be a fixed value or a variable value which varies in accordance with the vehicle speed V of the own vehicle SV. In the case where the predetermined distance is a variable value which varies in accordance with the vehicle speed V, the predetermined distance may be set such that the higher the vehicle speed V, the longer the predetermined distance.

In the case where the shape of a road section from the present position of the own vehicle SV to a position which is a predetermined distance away from the present position in the forward direction is straight, the road shape detection section 120 transmits to the light distribution pattern setting section 130 a piece of information indicating that the road shape in the forward direction is a straight road. Also, in the case where a left curve is present at a position which is a predetermined distance away in the forward direction from the present position of the own vehicle SV, the road shape detection section 120 transmits to the light distribution pattern setting section 130 a piece of information indicating that the road shape in the forward direction is a left curve. Similarly, in the case where a right curve is present at a position which is a predetermined distance away in the forward direction from the present position of the own vehicle SV, the road shape detection section 120 transmits to the light distribution pattern setting section 130 a piece of information indicating that the road shape in the forward direction is a right curve. Notably, when the road shape detection section 120 transmits the obtained road shape (the left curve, the right curve) to the light distribution pattern setting section 130, the road shape detection section 120 also transmits their curvatures to the light distribution pattern setting section 130.

The light distribution pattern setting section 130, which is one example of the light distribution control section of the present disclosure, sets the light distribution pattern of the headlamp 70 on the basis of the detection results transmitted from the light control target object detection section 100, the behavior detection section 110, and the road shape detection section 120. Namely, the light distribution pattern setting section 130 sets a high luminous intensity area HA and low luminous intensity areas LA within the entire irradiation area A of irradiation light projected from the headlamp 70 onto the imaginary vertical screen. Specifically, the light distribution pattern setting section 130 sets the high luminous intensity area HA and the low luminous intensity areas LA such that certain areas which are portions of the entire irradiation area A of the high beam irradiation of the headlamp 70 and which respectively contain the positions of the light control target objects detected by the light control target object detection section 100 become the low luminous intensity areas LA, and the area other than the low luminous intensity areas LA becomes the high luminous intensity area HA. Specific examples of the light distribution pattern set by the light distribution pattern setting section 130 will be described below.

FIG. 5 shows one example of the light distribution pattern set in the case where the light control target object detection section 100 detects, as light control target objects, a preceding vehicle V1, an oncoming vehicle V2, a head portion HD of a pedestrian HM, and a retroreflective object RS (e.g., a sign), the behavior detection section 110 detects none of the vertical displacement state and the lateral displacement state, and the road shape detection section 120 detects a straight road as the road shape in the forward direction.

In the case where the behavior detection section 110 detects none of the vertical displacement state and the lateral displacement state, it is supposed that the behavior of the own vehicle SV is stable. Also, in the case where the road shape detection section 120 detects a straight road as the road shape in the forward direction, it is supposed that the behavior of the own vehicle SV is stable for a certain period of time. In such a case, the light distribution pattern setting section 130 defines, as the low luminous intensity areas LA, smallest areas which contain the outlines of the light control target objects. As described above, in the case where the behavior of the own vehicle SV is stable, by minimizing the low luminous intensity areas LA, it becomes possible to prevent the driver's visibility around the light control target objects from lowering more than necessary. In the following description, each of the low luminous intensity areas LA shown in FIG. 5 will be referred to as a "standard low luminous intensity area LAs." The standard low luminous intensity area LAs is one example of the standard irradiation pattern of the present disclosure.

Figure 6:
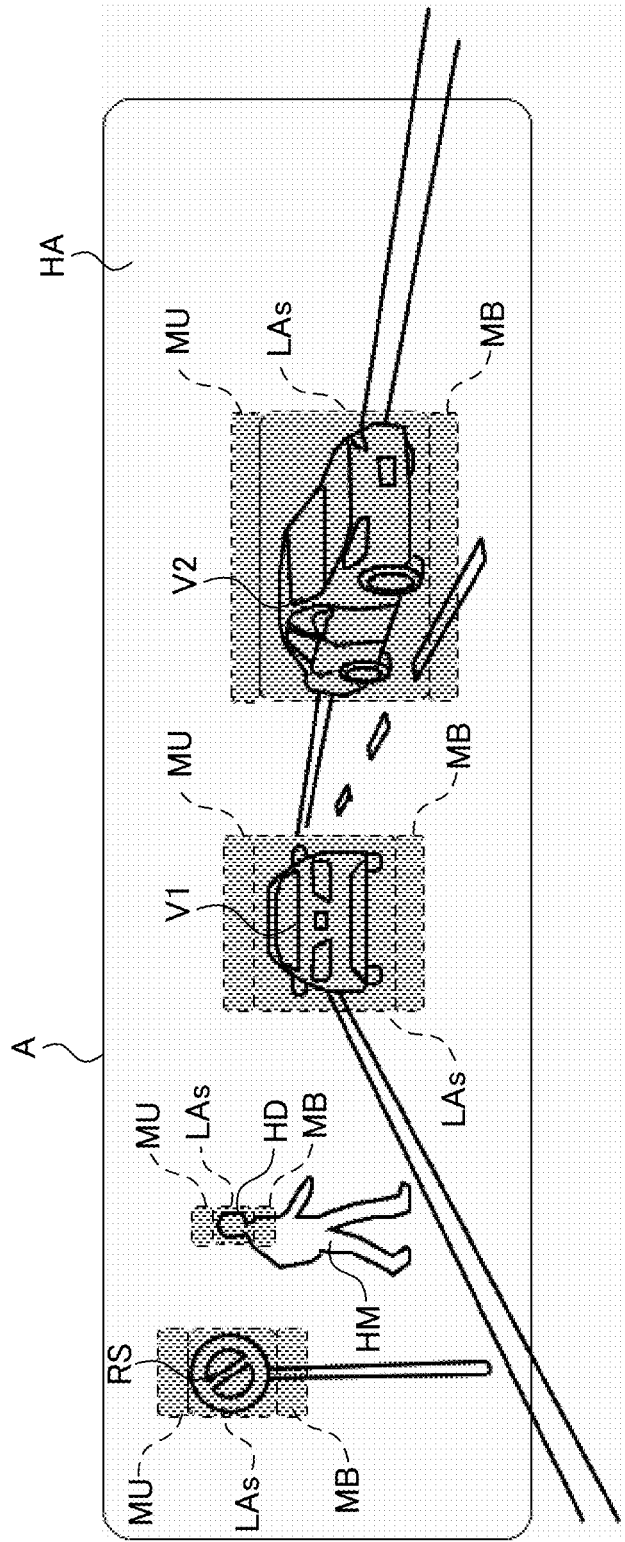
FIG. 6 is a schematic diagram used for describing another example of the light distribution pattern set by the light distribution pattern setting section.

FIG. 6 shows one example of the light distribution pattern set in the case where the light control target object detection section 100 detects, as light control target objects, the preceding vehicle V1, the oncoming vehicle V2, the head portion HD of the pedestrian HM, and the retroreflective object RS (e.g., a sign), and the behavior detection section 110 detects the vertical displacement state.

If the low luminous intensity areas LA are set to the standard low luminous intensity areas LAs in a situation where the behavior detection section 110 detects the vertical displacement state (e.g., the case where the own vehicle SV is traveling on a bumpy road), the standard low luminous intensity areas LAs may deviate from the light control target objects in the vertical direction as a result of a pitching movement of the own vehicle SV. In the case where the behavior detection section 110 detects the vertical displacement state, the light distribution pattern setting section 130 uses, as the low luminous intensity areas LA, areas each obtained by adding an upper margin MU and a lower margin MB to a corresponding standard low luminous intensity area LAs. Each of the upper margin MU and the lower margin MB may be a fixed value or a variable value. In the case where each of the upper margin MU and the lower margin MB is a variable value, the upper margin MU and the lower margin MB are expanded upward and downward, respectively, in accordance with the amount of the pitching movement of the own vehicle SV.

As described above, in the case where the behavior detection section 110 detects the vertical displacement state, each low luminous intensity area LA is determined by expanding a corresponding standard low luminous intensity area LAs upward and downward. As a result, it becomes possible to effectively prevent deviation of the low luminous intensity areas LA from the light control target objects in the vertical direction as a result of pitching movement of the own vehicle SV. Namely, it becomes possible to reliably prevent the drivers of the preceding vehicle V1 and the oncoming vehicle V2, the pedestrian HM, etc., from experiencing glare. Also, it becomes possible to effectively prevent occurrence of a state in which the driver of the own vehicle SV receives glaring reflection light from the retroreflective object RS.

Figure 7:
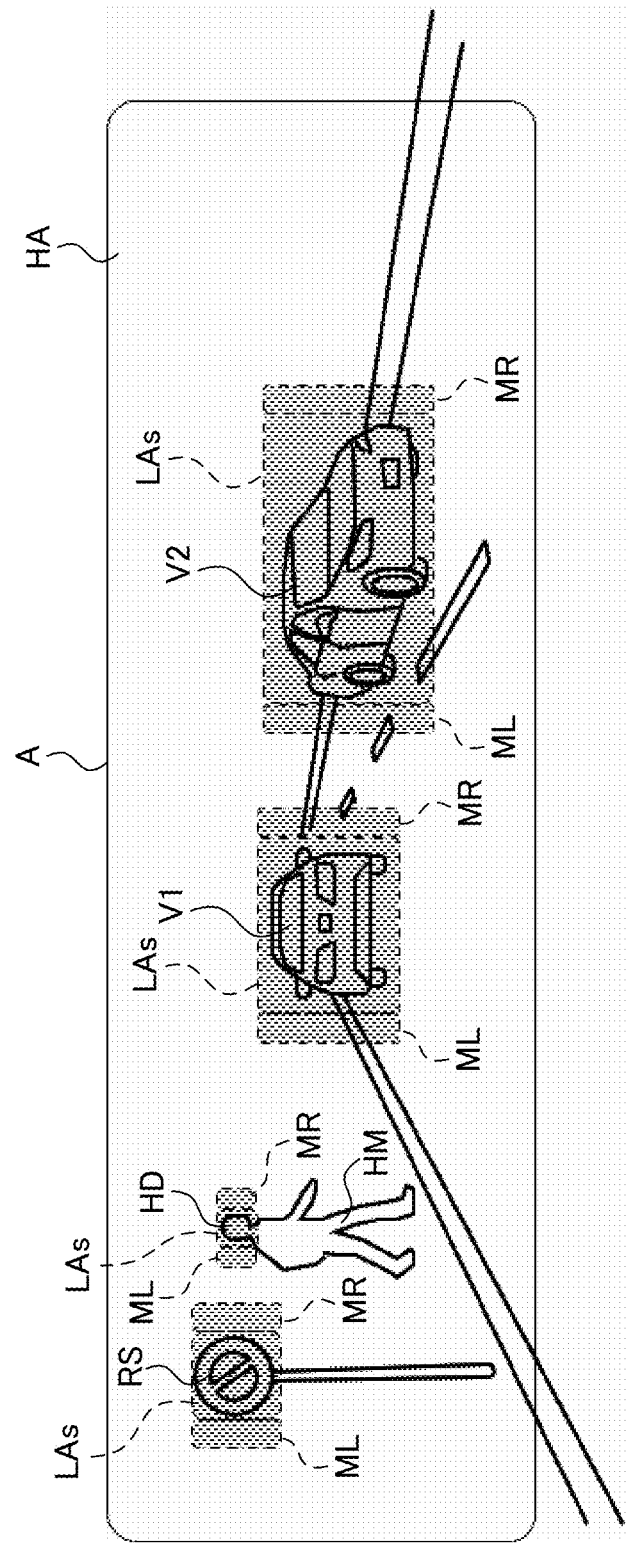
FIG. 7 is a schematic diagram used for describing another example of the light distribution pattern set by the light distribution pattern setting section.

FIG. 7 shows one example of the light distribution pattern set in the case where the light control target object detection section 100 detects, as light control target objects, the preceding vehicle V1, the oncoming vehicle V2, the head portion HD of the pedestrian HM, and the retroreflective object RS (e.g., a sign), and the behavior detection section 110 detects the lateral displacement state.

If the low luminous intensity areas LA are set to the standard low luminous intensity areas LAs in a situation where the behavior detection section 110 detects the lateral displacement state (e.g., the case where the driver of the own vehicle SV frequently repeats steering), the standard low luminous intensity areas LAs may deviate from the light control target objects in the lateral direction as a result of movements of the own vehicle SV in the lateral direction. In the case where the behavior detection section 110 detects the lateral displacement state, the light distribution pattern setting section 130 uses, as the low luminous intensity areas LA, areas each obtained by adding a left margin ML and a right margin MR to a corresponding standard low luminous intensity area LAs. Each of the left margin ML and the right margin MR may be a fixed value or a variable value. In the case where each of the left margin ML and the right margin MR is a variable value, the left margin ML and the right margin MR are expanded leftward and rightward, respectively, in accordance with the amount of steering input by the driver of the own vehicle SV.

As described above, in the case where the behavior detection section 110 detects the lateral displacement state, each low luminous intensity area LA is determined by expanding a corresponding standard low luminous intensity area LAs leftward and rightward. As a result, it becomes possible to effectively prevent deviation of the low luminous intensity areas LA from the light control target objects in the lateral direction as a result of steering input of the own vehicle SV. Namely, it becomes possible to reliably prevent the drivers of the preceding vehicle V1 and the oncoming vehicle V2, the pedestrian HM, etc., from experiencing glare. Also, it becomes possible to effectively prevent occurrence of a state in which the driver of the own vehicle SV receives glaring reflection light from the retroreflective object RS.

Figure 8:
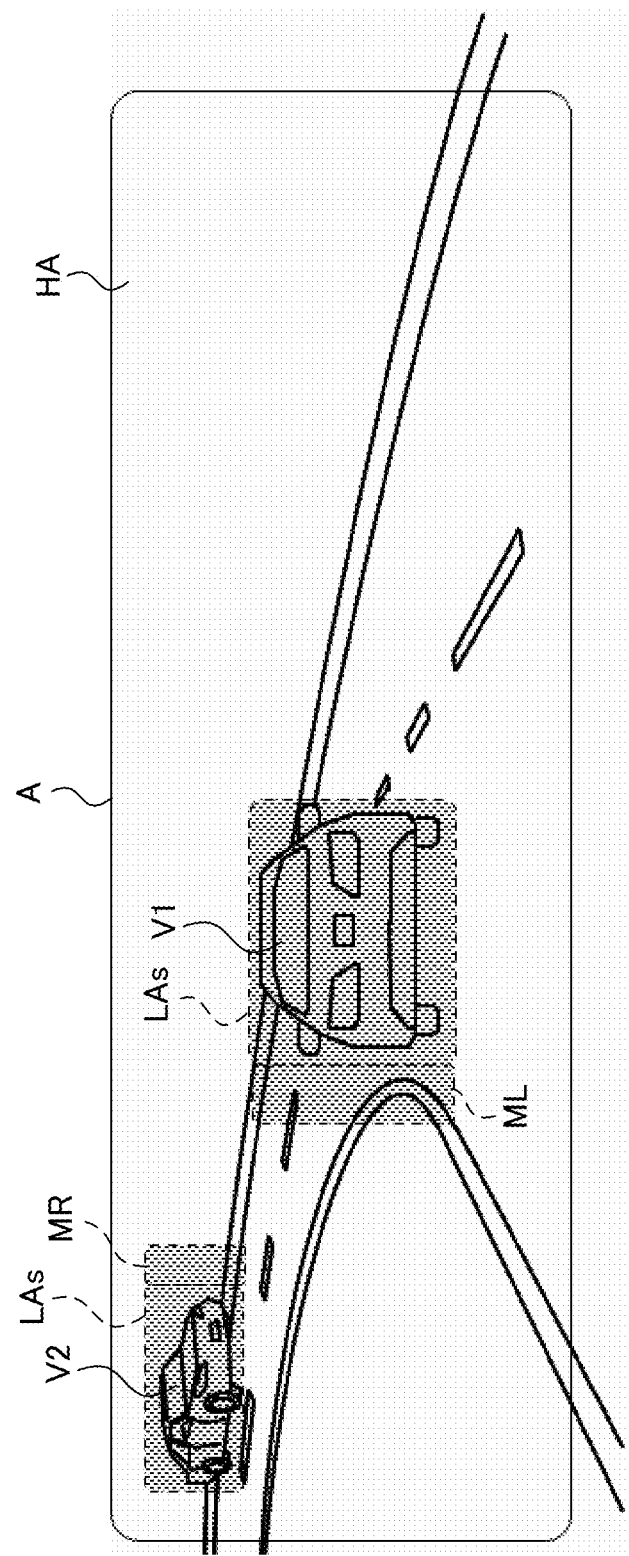
FIG. 8 is a schematic diagram used for describing another example of the light distribution pattern set by the light distribution pattern setting section.

FIG. 8 shows one example of the light distribution pattern set in the case where the light control target object detection section 100 detects, as light control target objects, a preceding vehicle V1 and/or an oncoming vehicle V2, and the road shape detection section 120 detects a left curve as the road shape in the forward direction.

In the case where a left curve is present in the forward direction of the own vehicle SV and a preceding vehicle V1 is present, it is supposed that, when the preceding vehicle V1 enters the left curve before the own vehicle SV enters the left curve, the preceding vehicle V1 moves in a leftward direction on the imaginary vertical screen as viewed from the own vehicle SV. Also, in the case where a left curve is present in the forward direction of the own vehicle SV and an oncoming vehicle V2 is present, it is supposed that the oncoming vehicle V2 traveling on the left curve moves in a rightward direction on the imaginary vertical screen as viewed from the own vehicle SV. If each low luminous intensity area LA is set to coincide with the corresponding standard low luminous intensity area LAs in such a situation, the preceding vehicle V1 having entered the left curve may deviate leftward from the corresponding standard low luminous intensity area LAs, and the oncoming vehicle V2 traveling on the left curve may deviate rightward from the corresponding standard low luminous intensity area LAs.

In the case where the light control target object detection section 100 detects a preceding vehicle V1 and a road shape detection section 120 detects a left curve, the light distribution pattern setting section 130 uses, as a low luminous intensity area LA, an area obtained by adding a left margin (a margin on the side toward which the preceding vehicle V1 moves) ML to the standard low luminous intensity area LAs containing the preceding vehicle V1. Since, as described above, the left margin ML is added on the left side toward which the preceding vehicle V1 moves, it becomes possible to effectively prevent occurrence of a problem that, when the preceding vehicle V1 enters the left curve before the own vehicle SV, the driver of the preceding vehicle V1 experiences glare. Also, since the left margin ML is added only on the left side toward which the preceding vehicle V1 moves, it is possible to effectively secure the driver's visibility on the inner side of the curve, as compared with the configuration of widely setting a dimming area on the inner side of the left curve. The left margin ML may be a fixed value or a variable value. In the case where the left margin ML is a variable value, the left margin ML is expanded leftward such that the higher the relative speed of the preceding vehicle V1 in relation to the own vehicle SV or the greater the curvature of the left curve, the greater the degree to which the left margin ML is expanded.

In the case where the light control target object detection section 100 detects the oncoming vehicle V2 and the road shape detection section 120 detects the left curve, the light distribution pattern setting section 130 uses, as a low luminous intensity area LA, an area obtained by adding a right margin (a margin on the right side toward which the oncoming vehicle V2 moves) MR to the standard low luminous intensity area LAs containing the oncoming vehicle V2. Since, as described above, the right margin MR is added on the right side toward which the oncoming vehicle V2 moves, it becomes possible to effectively prevent the driver of the oncoming vehicle V2 traveling on the left curve from experiencing glare. The right margin MR may be a fixed value or a variable value. In the case where the right margin MR is a variable value, the right margin MR is expanded rightward such that the higher the relative speed of the oncoming vehicle V2 in relation to the own vehicle SV or the greater the curvature of the left curve, the greater the degree to which the right margin MR is expanded.

Notably, in the case where the light control target object detection section 100 detects, as a light control target object(s), the preceding vehicle V1 and/or the oncoming vehicle V2 and the road shape detection section 120 detects a right curve as the road shape in the forward direction, the light distribution pattern setting section 130 sets a light distribution pattern obtained by laterally inverting the light distribution pattern shown in FIG. 8. Namely, the light distribution pattern setting section 130 uses, as a low luminous intensity area LA, an area obtained by adding a right margin (a margin on the side toward which the preceding vehicle V1 moves) MR to the standard low luminous intensity area LAs containing the preceding vehicle V1, and uses, as a low luminous intensity area LA, an area obtained by adding a left margin (a margin on the side toward which the oncoming vehicle V2 moves) ML to the standard low luminous intensity area LAs containing the oncoming vehicle V2. Therefore, the low luminous intensity areas LA set in the case where the road shape detection section 120 detects a right curve will not be described with reference to the drawings.

Figure 9:
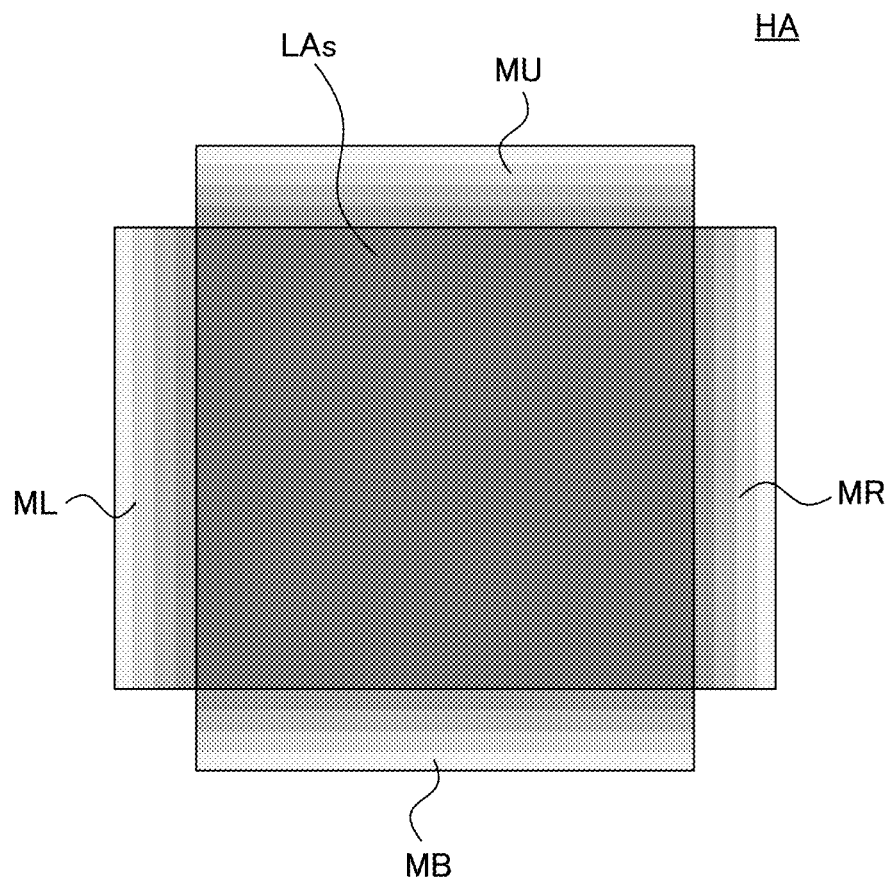
FIG. 9 is a schematic diagram used for describing a modification of the light distribution pattern set by the light distribution pattern setting section.

In the examples of FIGS. 6 to 8, the margins MU, MB, ML, and MR are shown such that the brightness (luminous intensity) in the margins MU, MB, ML, and MR is the same as the brightness in the standard low luminous intensity area LAs. However, as shown in FIG. 9, the margins MU, MB, ML, and MR may be gradating areas (gradual change areas) in which the brightness (luminous intensity) is increased gradually from the standard low luminous intensity area LAs toward the high luminous intensity area HA. In the case where the margins MU, MB, ML, and MR are gradating areas, since the amount of irradiation light at an edge portion of the low luminous intensity area LA decreases, it is possible to effectively suppress glare which the drivers of the preceding vehicle V1 and the oncoming vehicle V2 and the pedestrian HM feel. Also, as to the driver of the own vehicle SV, a decrease in visibility near the edge portion of the low luminous intensity area LA can be prevented effectively.

Referring back to FIG. 4, the irradiation light control section 140, which is one example of the light distribution control section of the present disclosure, outputs an irradiation light control signal to the headlamp 70 on the basis of the high luminous intensity area HA and the low luminous intensity area(s) LA set by the light distribution pattern setting section 130. As a result, high beam irradiation light is projected in a desired light distribution pattern from the headlamp 70 onto the imaginary vertical screen. At that time, the irradiation light control section 140 displays a message on the display device 61 of the HMI 60, the message showing that the high beam of the headlamp 70 is controlled on the basis of the desired light distribution pattern. As a result, the driver of the own vehicle SV can know that the high beam does not reach other vehicles, a pedestrian(s), etc. Namely, it is possible to effectively mitigate the uneasiness that the driver of the own vehicle SV feels about the possibility of the high beam reaching other vehicles, a pedestrian(s), etc.

Figure 10:
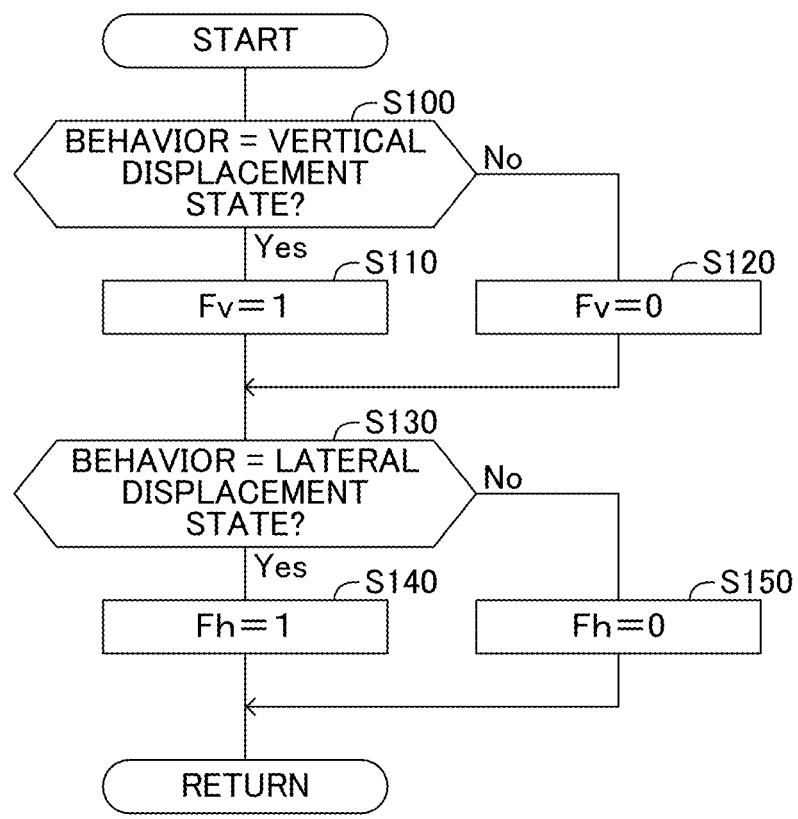
FIG. 10 is a flowchart used for describing a process of setting a low luminous intensity area.

FIG. 10 is a flowchart used for describing a process of setting the low luminous intensity area(s) LA, which is performed by the ECU 10. The routine shown in FIG. 10 is started upon activation of the AHS.

In step S100, the ECU 10 determines whether or not the behavior of the own vehicle SV is in the vertical displacement state. In the case where the behavior of the own vehicle SV is in the vertical displacement state (Yes), the ECU 10 proceeds to step S110 and turns on a vertical margin addition flag Fv (Fv=1). The vertical margin addition flag Fv indicates that an upper margin MU and a lower margin MB are to be added to each standard low luminous intensity area LAs. Meanwhile, in the case where the behavior of the own vehicle SV is not in the vertical displacement state (No), the ECU 10 proceeds to step S120 and turns off the vertical margin addition flag Fv (Fv=0).

In step S130, the ECU 10 determines whether or not the behavior of the own vehicle SV is in the lateral displacement state. In the case where the behavior of the own vehicle SV is in the lateral displacement state (Yes), the ECU 10 proceeds to step S140 and turns on a lateral margin addition flag Fh (Fh=1). The lateral margin addition flag Fh indicates that a left margin ML and a right margin MR are to be added to each standard low luminous intensity area LAs. Meanwhile, in the case where the behavior of the own vehicle SV is not in the lateral displacement state (No), the ECU 10 proceeds to step S150 and turns off the lateral margin addition flag Fh (Fh=0). After that, the ECU 10 repeatedly executes the above-described process until the AHS is stopped.

Figure 11:
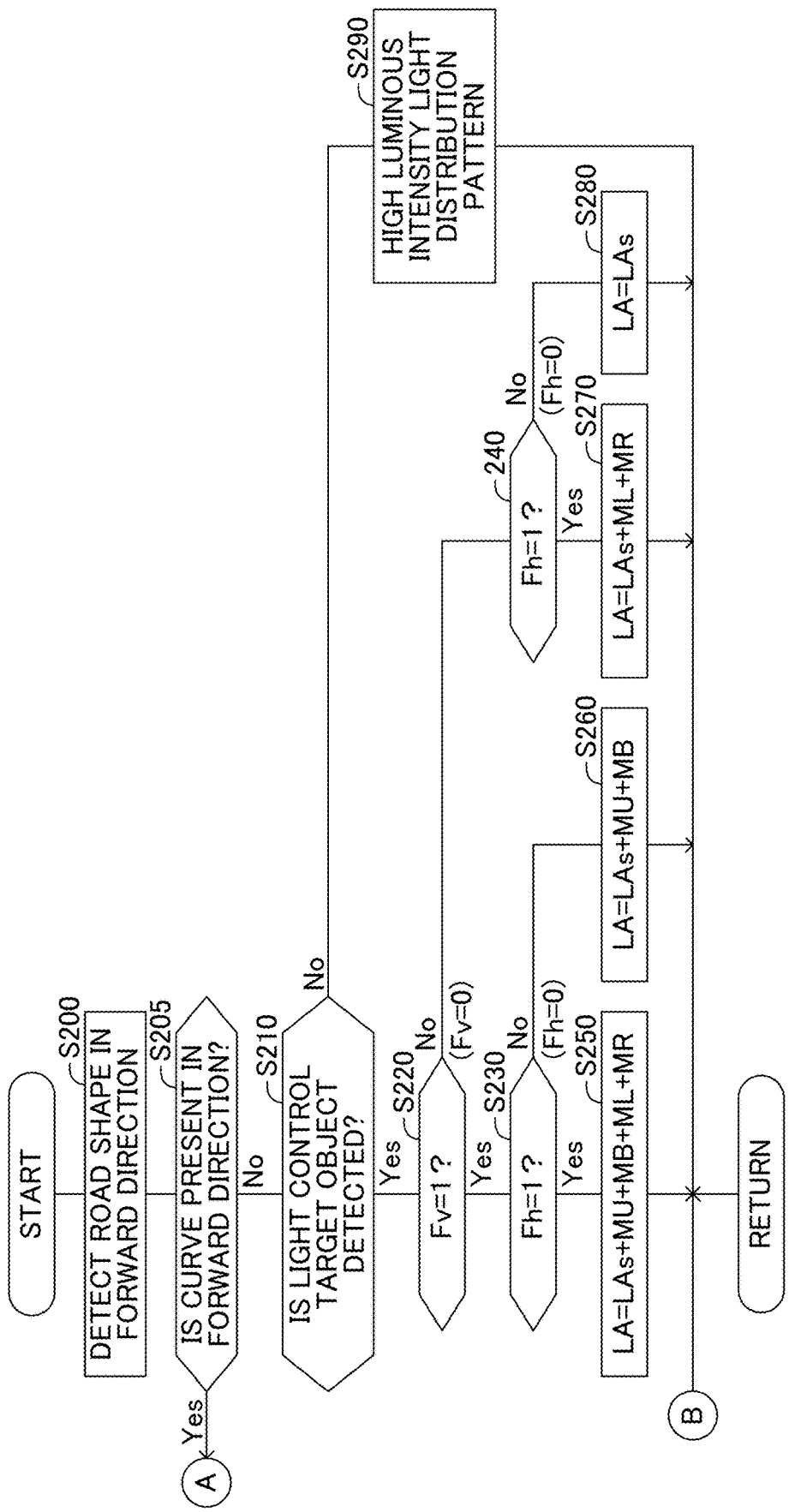
FIG. 11 is a flowchart used for describing the routine of light distribution control.
Figure 12:
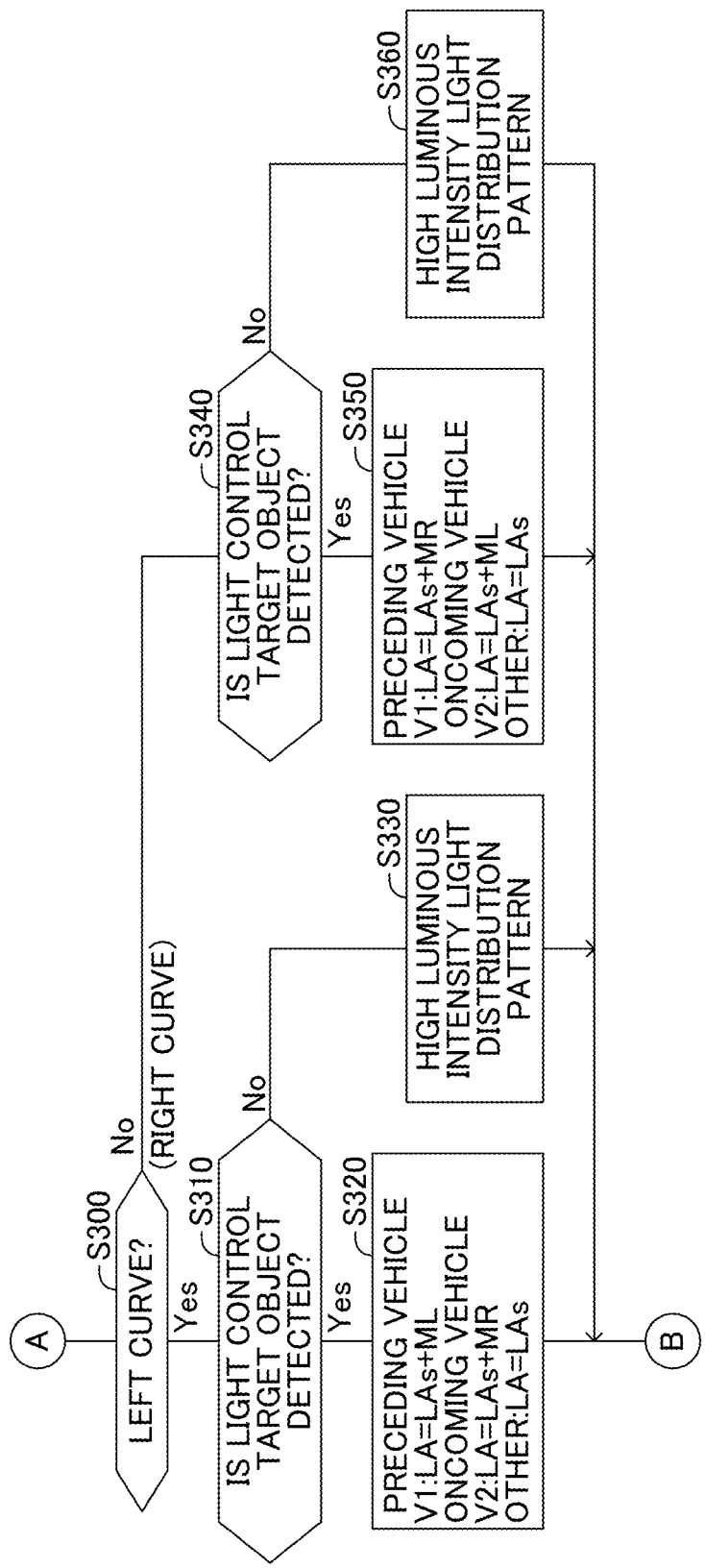
FIG. 12 is a flowchart used for describing the routine of light distribution control.

FIGS. 11 and 12 are flowcharts used for describing a light distribution control routine executed by the ECU 10. The routine shown in FIGS. 11 and 12 is started upon activation of the AHS and is executed in parallel with the routine shown in FIG. 10.

In step S200, the ECU 10 obtains the road shape in the forward direction of the own vehicle SV. Subsequently, in step S205, the ECU 10 determines whether or not the obtained road shape is a curve. In the case where the obtained road shape is a curve (Yes), the ECU 10 proceeds to step S300 of a flow shown in FIG. 12. Meanwhile, in the case where the detected road shape is not a curve (No), the ECU 10 proceeds to step S210.

In step S210, the ECU 10 determines whether or not a light control target object (for example, a preceding vehicle V1, an oncoming vehicle V2, a head portion HD of a pedestrian HM, or a retroreflective object RS (e.g., a road sign) is present in the forward direction of the own vehicle SV. In the case where a light control target object is present (Yes), the ECU 10 proceeds to step S220. Meanwhile, in the case where a light control target object is not present (No), the ECU 10 proceeds to step S290. In step S290, the ECU 10 controls the high beam irradiation of the headlamp 70 on the basis of a high luminous intensity light distribution pattern determined such that the entire irradiation area A becomes a high luminous intensity area HA. Subsequently, the ECU 10 ends the present routine and returns to an illustrated original (base) routine.

In step S220, the ECU 10 determines whether or not the vertical margin addition flag Fv has been turned on (Fv=1). In the case where the vertical margin addition flag Fv is ON (Fv=1) (Yes), the ECU 10 proceeds to step S230. Meanwhile, in the case where the vertical margin addition flag Fv is OFF (Fv=0) (No), the ECU 10 proceeds to step S240.

In step S230, the ECU 10 determines whether or not the lateral margin addition flag Fh has been turned on (Fh=1). In the case where the lateral margin addition flag Fh is ON (Fh=1) (Yes), the ECU 10 proceeds to step S250. In step S250, the ECU 10 controls the high beam irradiation of the headlamp 70 on the basis of a light distribution pattern for adding the upper margin MU, the lower margin MB, the left margin ML, and the right margin MR to each standard low luminous intensity area LAs (LA=LAs+MU+MB+ML+MR). Subsequently, the ECU 10 ends the present routine and returns to the illustrated original (base) routine. Meanwhile, in the case where the lateral margin addition flag Fh is OFF (Fh=0) (No), the ECU 10 proceeds to step S260. In step S260, the ECU 10 controls the high beam irradiation of the headlamp 70 on the basis of a light distribution pattern for adding the upper margin MU and the lower margin MB to each standard low luminous intensity area LAs (LA=LAs+MU+MB). Subsequently, the ECU 10 ends the present routine and returns to the original (base) routine.

In the case where the ECU 10 determines in S220 that the vertical margin addition flag Fv has not been turned on (No), the ECU 10 proceeds to step S240 so as to determine whether or not the lateral margin addition flag Fh has been turned on (Fh=1). In the case where the lateral margin addition flag Fh is ON (Fh=1) (Yes), the ECU 10 proceeds to step S270. In step S270, the ECU 10 controls the high beam irradiation of the headlamp 70 on the basis of a light distribution pattern for adding the left margin ML and the right margin MR to each standard low luminous intensity area LAs (LA=LAs+ML+MR). Subsequently, the ECU 10 ends the present routine and returns to the original (base) routine. Meanwhile, in the case where the lateral margin addition flag Fh is OFF (Fh=0) (No), the ECU 10 proceeds to step S280. In step S280, the ECU 10 controls the high beam irradiation of the headlamp 70 on the basis of a standard light distribution pattern in which the low luminous intensity area LA coincides with the standard low luminous intensity area LAs (LA=LAs). Subsequently, the ECU 10 ends the present routine and returns to the original (base) routine.

In the case where the ECU 10 determines in step S205 that the road shape is a curve (Yes), the ECU 10 proceeds to step S300 shown in FIG. 12.

In step S300, the ECU 10 determines whether or not the road shape in the forward direction of the own vehicle SV is a left curve. In the case where the road shape in the forward direction of the own vehicle SV is a left curve (Yes), the ECU 10 proceeds to step S310. Meanwhile, in the case where the road shape in the forward direction of the own vehicle SV is not a left curve (No); i.e., the road shape is a right curve, the ECU 10 proceeds to step S340.

In step S310, the ECU 10 determines whether or not a light control target object (for example, a preceding vehicle V1, an oncoming vehicle V2, a head portion HD of a pedestrian HM, or a retroreflective object RS (e.g., a road sign) is present in the forward direction of the own vehicle SV. In the case where a light control target object is present (Yes), the ECU 10 proceeds to step S320. Meanwhile, in the case where a light control target object is not present (No), the ECU 10 proceeds to step S330. In step S330, the ECU 10 controls the high beam irradiation of the headlamp 70 on the basis of a high luminous intensity light distribution pattern determined such that the entire irradiation area A becomes a high luminous intensity area HA. Subsequently, the ECU 10 ends the present routine and returns to the original (base) routine.

In step S320, the ECU 10 sets the low luminous intensity area LA in accordance with the light control target object. Specifically, in the case where the preceding vehicle V1 is detected as a light control target object, the ECU 10 controls the high beam irradiation of the headlamp 70 on the basis of a light distribution pattern in which the left margin ML is added to the standard low luminous intensity area LAs containing the preceding vehicle V1 (LA=LAs+ML). Also, in the case where the oncoming vehicle V21 is detected as a light control target object, the ECU 10 controls the high beam irradiation of the headlamp 70 on the basis of a light distribution pattern in which the right margin MR is added to the standard low luminous intensity area LAs containing the oncoming vehicle V2 (LA=LAs+MR). Furthermore, in the case where a light control target object (the pedestrian HM, the retroreflective object RS, etc.) other than the preceding vehicle V1 and the oncoming vehicle V2 is detected, the ECU 10 controls the high beam irradiation of the headlamp 70 on the basis of a standard light distribution pattern in which the low luminous intensity area LA coincides with the standard low luminous intensity area LAs containing the light control target object (LA=LAs). Subsequently, the ECU 10 ends the present routine and returns to the original (base) routine.

In the case where the determination in step S300 is a negative determination (No); i.e., the road shape in the forward direction is a right curve, the ECU 10 proceeds to step S340. In step S340, the ECU 10 determines whether or not a light control target object (for example, a preceding vehicle V1, an oncoming vehicle V2, a head portion HD of a pedestrian HM, or a retroreflective object RS (e.g., a road sign) is present in the forward direction of the own vehicle SV. In the case where a light control target object is present (Yes), the ECU 10 proceeds to step S350. Meanwhile, in the case where a light control target object is not present (No), the ECU 10 proceeds to step S360. In step S360, the ECU 10 controls the high beam irradiation of the headlamp 70 on the basis of the high luminous intensity light distribution pattern determined such that the entire irradiation area A becomes a high luminous intensity area HA. Subsequently, the ECU 10 ends the present routine and returns to the original (base) routine.

In step S350, the ECU 10 sets the low luminous intensity area LA in accordance with the light control target object. Specifically, in the case where the preceding vehicle V1 is detected as a light control target object, the ECU 10 controls the high beam irradiation of the headlamp 70 on the basis of a light distribution pattern in which the right margin MR is added to the standard low luminous intensity area LAs containing the preceding vehicle V1 (LA=LAs+MR). Also, in the case where the oncoming vehicle V2 is detected as a light control target object, the ECU 10 controls the high beam irradiation of the headlamp 70 on the basis of a light distribution pattern in which the left margin ML is added to the standard low luminous intensity area LAs containing the oncoming vehicle V2 (LA=LAs+ML). Furthermore, in the case where a light control target object (the pedestrian HM, the retroreflective object RS, etc.) other than the preceding vehicle V1 and the oncoming vehicle V2 is detected, the ECU 10 controls the high beam irradiation of the headlamp 70 on the basis of the standard light distribution pattern in which the low luminous intensity area LA coincides with the standard low luminous intensity area LAs containing the light control target object (LA=LAs). Subsequently, the ECU 10 ends the present routine and returns to the original (base) routine.

In the present embodiment having been described in detail above, in the case where the behavior detection section 110 detects a vertical displacement state as a behavior of the own vehicle SV, the light distribution pattern setting section 130 uses, as a low luminous intensity area LA, an area obtained by adding the upper margin MU and the lower margin MB to a standard low luminous intensity area LAs containing a light control target object. As a result, it becomes possible to effectively prevent deviation of the low luminous intensity areas LA from the light control target objects in the vertical direction as a result of pitching movement of the own vehicle SV, thereby reliably preventing the drivers of the preceding vehicle V1 and the oncoming vehicle V2, the pedestrian HM, etc., from experiencing glare.

In the present embodiment, in the case where the behavior detection section 110 detects a lateral displacement state as a behavior of the own vehicle SV, the light distribution pattern setting section 130 uses, as a low luminous intensity area LA, an area obtained by adding the left margin ML and the right margin MR to a standard low luminous intensity area LAs containing a light control target object. As a result, it becomes possible to effectively prevent deviation of the low luminous intensity areas LA from the light control target objects in the lateral direction as a result of steering input of the own vehicle SV, thereby reliably preventing the drivers of the preceding vehicle V1 and the oncoming vehicle V2, the pedestrian HM, etc., from experiencing glare.

In the present embodiment, in the case where the road shape detection section 120 detects a left curve or a right curve as a road shape in the forward direction, the light distribution pattern setting section 130 uses, as a low luminous intensity area LA, an area obtained by adding the left margin ML or the right margin MR (i.e., the margin on the side toward which the preceding vehicle V1 moves) to a standard low luminous intensity area LAs containing the preceding vehicle V1. Also, the light distribution pattern setting section 130 uses, as a low luminous intensity area LA, an area obtained by adding the left margin ML or the right margin MR (i.e., the margin on the side toward which the oncoming vehicle V2 moves) to a standard low luminous intensity area LAs containing the oncoming vehicle V2. As a result, it becomes possible to effectively prevent the preceding vehicle V1 which enters the curve before the own vehicle SV or the oncoming vehicle V2 traveling on the curve in forward direction of the own vehicle SV, from experiencing glare.

Although the vehicle headlamp control apparatus, the vehicle headlamp control method, and the vehicle headlamp control program according to the present embodiment have been described, the present disclosure is not limited to the above-described embodiment, and various modifications can be made without departing from the object of the present disclosure.

For example, each low luminous intensity area LA can be set on the basis of weather information, road surface information, etc. obtained by the communication device 50 through V2X communication. Specifically, in the case where the communication device 50 obtains, as weather information, a piece of information indicating rainfall or snowfall or obtains, as road surface information, a piece of information indicating, for example, that the road surface is frozen, the light distribution pattern setting section 130 may use, as a low luminous intensity area LA, an area obtained by adding the margins MU, MB, ML, and MR to a standard low luminous intensity area LAs containing a light control target object. It becomes possible to further optimize the light distribution control by expanding the low luminous intensity area LA from the standard low luminous intensity area LAs in accordance with weather information or road surface information as described above.

Also, in the case where the road shape detection section 120 detects an uphill road as a road shape in the forward direction of the own vehicle SV and the light control target object detection section 100 detects a preceding vehicle V1 as a light control target object, the light distribution pattern setting section 130 may use, as a low luminous intensity area LA, an area obtained by adding the upper margin MU (the margin on the side toward which the preceding vehicle V1 moves) to a standard low luminous intensity area LAs containing the preceding vehicle V1. Similarly, in the case where the road shape detection section 120 detects an uphill road as a road shape in the forward direction of the own vehicle SV and the light control target object detection section 100 detects an oncoming vehicle V2 as a light control target object, the light distribution pattern setting section 130 may use, as a low luminous intensity area LA, an area obtained by adding the lower margin MD (the margin on the side toward which the oncoming vehicle V2 moves) to a standard low luminous intensity area LAs containing the oncoming vehicle V2. By virtue of this, it becomes possible to effectively prevent the preceding vehicle V1 having entered the uphill road before the own vehicle SV or the oncoming vehicle V2 traveling down the uphill road (downhill road as viewed from the oncoming vehicle V2) from experiencing glare.

In the above-described embodiment, the light distribution pattern of the headlamp 70 has been described such that low luminous intensity areas LA and a high luminous intensity area HA are set within the entire irradiation area A. However, it is possible to define a certain area within the entire irradiation area A as a light quantity increased area in which the amount of light is increased, as compared with the remaining area, in accordance with a purpose.

Needless to say, the vehicle headlamp control apparatus, the vehicle headlamp control method, and the vehicle headlamp control program according to the present embodiment can be applied to autonomous vehicles which allow autonomous driving. The expression "autonomous driving" is a conceptual expression which encompasses driving assistance.

What is claimed is:

1. A control apparatus for controlling a vehicle headlamp which projects irradiation light toward a forward direction of an own vehicle, comprising:
   a target object detection section which detects a light control target object which is present in the forward direction of the own vehicle and within an irradiation area of the headlamp;
   a behavior detection section which detects a behavior of the own vehicle or determines whether or not a change in behavior of the own vehicle is expected; and
   a light distribution control section which controls a light distribution of the headlamp on the basis of a result of detection by the target object detection section and a result of detection or determination by the behavior detection section, wherein
   in the case where the behavior of the own vehicle detected by the behavior detection section is in a first behavior state in which a change in the irradiation area of the headlamp becomes equal to or less than a predetermined amount or it is expected that the behavior of the own vehicle does not change from the first behavior state, the light distribution control section causes the headlamp to project irradiation light toward the light control target object in a predetermined standard irradiation pattern, and
   in the case where the behavior of the own vehicle detected by the behavior detection section is in a second behavior state in which the change in the irradiation area of the headlamp exceeds the predetermined amount or it is expected that the behavior of the own vehicle changes to the second behavior state, the light distribution control section causes the headlamp to project irradiation light toward the light control target object in an irradiation pattern different from the standard irradiation pattern.

2. A control apparatus according to claim 1, wherein the light distribution control section sets a light control target area within the irradiation area at a position corresponding to the light control target object, the light control target area being an area toward which irradiation light having a luminous intensity different from that in the remaining area within the irradiation area is projected,
  wherein, in the case where the second behavior state is a behavior state in which the irradiation area of the headlamp moves vertically by an amount greater than the predetermined amount, the light distribution control section expands the light control target area upward and downward in relation to the standard irradiation pattern or adds gradual change areas to upper and lower edges of the light control target area, the gradual change areas being areas in which luminous intensity is changed gradually, and
  wherein, in the case where the second behavior state is a behavior state in which the irradiation area of the headlamp moves laterally by an amount greater than the predetermined amount, the light distribution control section expands the light control target area leftward and rightward in relation to the standard irradiation pattern or adds gradual change areas to left and right edges of the light control target area, the gradual change areas being areas in which luminous intensity is changed gradually.

3. A control apparatus according to claim 2, wherein the light distribution control section dims the irradiation light projected toward the light control target area, as compared with the irradiation light projected toward the remaining area.

4. A control apparatus according to claim 3, wherein, in the case where the target object detection section detects, as the light control target object, a preceding vehicle traveling in the forward direction of the own vehicle and the behavior detection section determines that the behavior of the own vehicle is expected to change as a result of traveling on a curved road present in the forward direction of the own vehicle, the light distribution control section expands the light control target area toward an inner side of the curved road toward which the preceding vehicle, which enters the curved road before the own vehicle, travels, or adds the gradual change area to an edge of the light control target area on the inner side of the curved road.

5. A control apparatus according claim 1, wherein the behavior detection section detects a behavior of the own vehicle or determines whether or not a change in behavior of the own vehicle is expected, on the basis of at least one of a result of detection by a sensor which detects a state of the own vehicle, a road shape in the forward direction of the own vehicle obtained from a piece of map information and a GPS apparatus, a piece of information received through V2X communication, and a piece of weather information.

6. A control method for controlling a vehicle headlamp which projects irradiation light toward a forward direction of an own vehicle, the control method comprising the steps of:
  detecting a light control target object which is present in the forward direction of the own vehicle and within an irradiation area of the headlamp;
  detecting a behavior of the own vehicle or determining whether or not a change in behavior of the own vehicle is expected; and
  controlling a light distribution of the headlamp on the basis of a result of detecting the light control target object and a result of detecting or determining by the behavior of the own vehicle, wherein
  in the case where the behavior of the own vehicle is detected in a first behavior state in which a change in the irradiation area of the headlamp becomes equal to or less than a predetermined amount or it is expected that the behavior of the own vehicle does not change from the first behavior state, in controlling the light distribution of the headlamp, the headlamp is caused to project irradiation light toward the light control target object in a predetermined standard irradiation pattern, and
  in the case where the behavior of the own vehicle is detected in a second behavior state in which the change in the irradiation area of the headlamp exceeds the predetermined amount or it is expected that the behavior of the own vehicle changes to the second behavior state, in controlling the light distribution of the headlamp, the headlamp is caused to project irradiation light toward the light control target object in an irradiation pattern different from the standard irradiation pattern.

7. A non-transitory storage medium for storing executable instructions of a program for a computer of a vehicle headlamp which projects irradiation light toward a forward direction of an own vehicle, wherein the program causes the computer to execute:
  target object detection which detects a light control target object which is present in the forward direction of the own vehicle and within an irradiation area of the headlamp;
  behavior detection which detects a behavior of the own vehicle or determines whether or not a change in behavior of the own vehicle is expected; and
  light distribution control which controls a light distribution of the headlamp on the basis of a result of detection by the target object detection and a result of detection or determination by the behavior detection, wherein
  in the case where the behavior of the own vehicle detected by the behavior detection is in a first behavior state in which a change in the irradiation area of the headlamp becomes equal to or less than a predetermined amount or it is expected that the behavior of the own vehicle does not change from the first behavior state, in the light distribution control, the headlamp is caused to project irradiation light toward the light control target object in a predetermined standard irradiation pattern, and
  in the case where the behavior of the own vehicle detected by the behavior detection is in a second behavior state in which the change in the irradiation area of the headlamp exceeds the predetermined amount or it is expected that the behavior of the own vehicle changes to the second behavior state, in the light distribution control, the headlamp is caused to project irradiation light toward the light control target object in an irradiation pattern different from the standard irradiation pattern.

* * * * *